Sept. 21, 1971  J. C. LOCHRIDGE  3,606,759
PIPELAYING SYSTEM UTILIZING AUXILIARY RAMP MEANS
Filed July 16, 1970  2 Sheets-Sheet 1
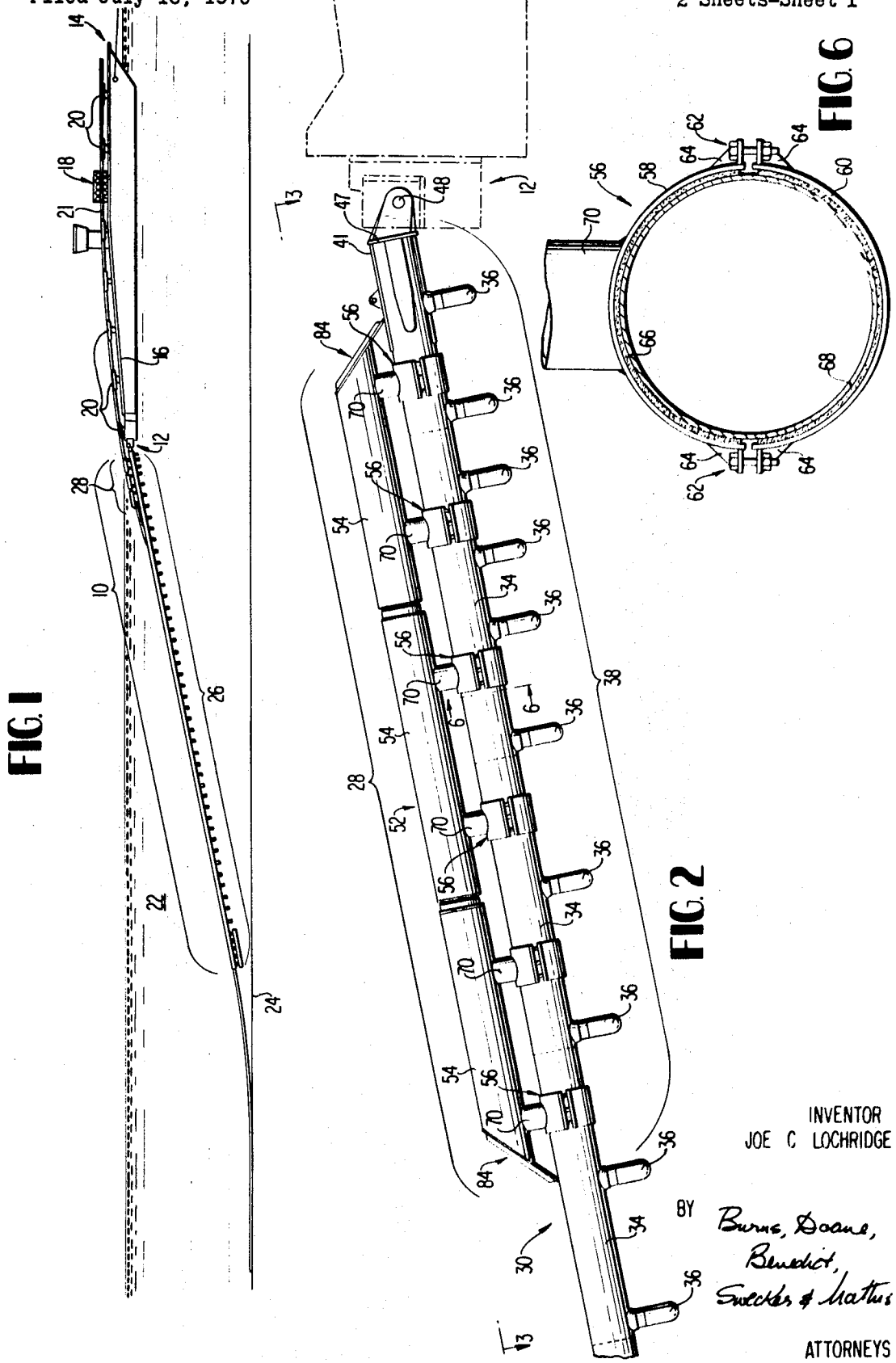
INVENTOR
JOE C LOCHRIDGE
BY Burns, Doane,
Benedict,
Swecker & Mathis
ATTORNEYS Sept. 21, 1971   J. C. LOCHRIDGE   3,606,759
PIPELAYING SYSTEM UTILIZING AUXILIARY RAMP MEANS
Filed July 16, 1970   2 Sheets-Sheet 2
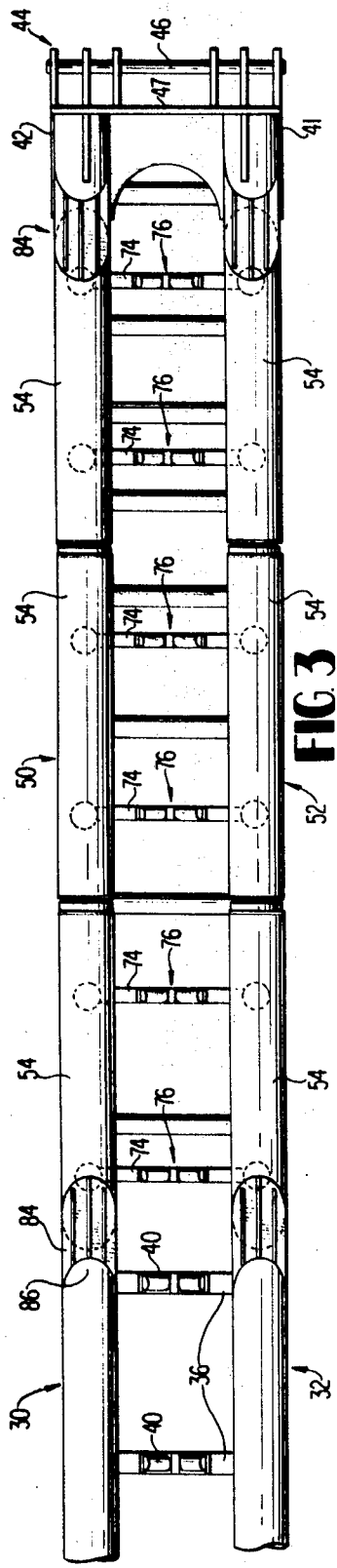
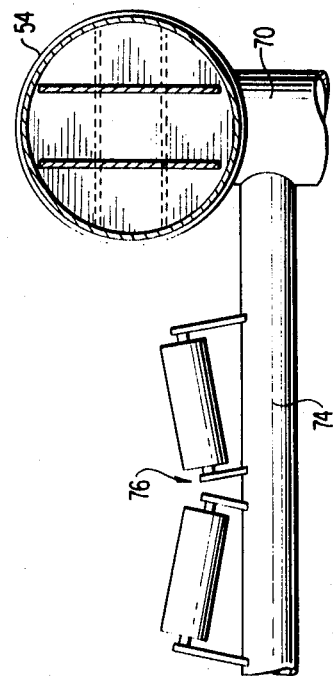
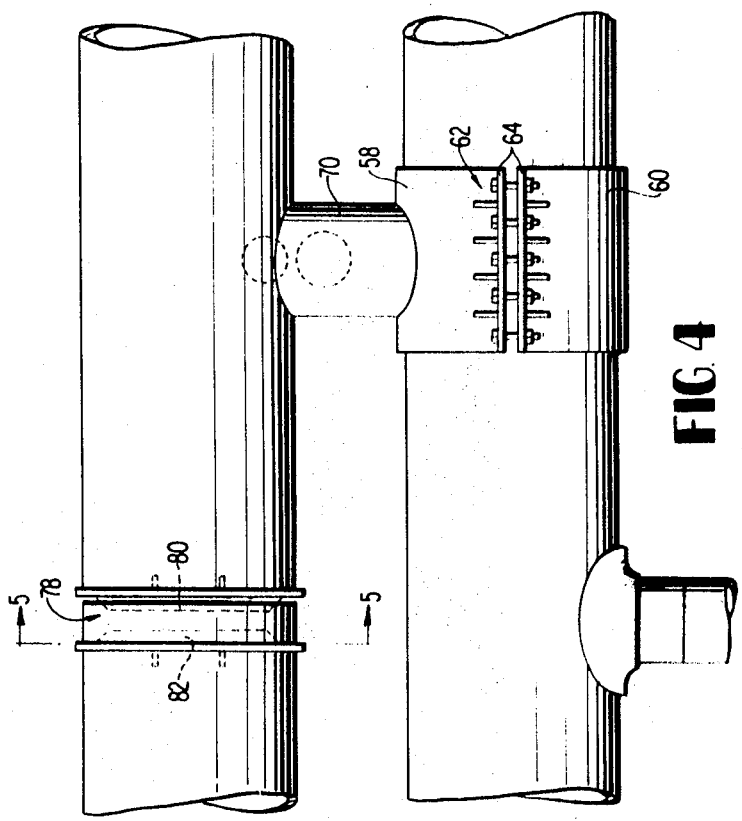

United States Patent Office 3,606,759
Patented Sept. 21, 1971

3,606,759
PIPELAYING SYSTEM UTILIZING AUXILIARY RAMP MEANS
Joe C. Lochridge, Houston, Tex., assignor to Brown & Root, Inc., Houston, Tex.
Filed July 16, 1970, Ser. No. 55,528
Int. Cl. B63b 35/04; F16l 1/00
U.S. Cl. 61—72.3                        17 Claims

ABSTRACT OF THE DISCLOSURE

A method and apparatus for use in a pipelaying operation utilizing primary ramp means adapted to be pivotally attached to a floating vessel and including primary support means to buoyantly and slidably support a leading portion of pipeline depending from the floating vessel into a body of water. Auxiliary ramp means, including auxiliary support means for slidably supporting a trailing portion of the pipeline, is carried by the primary ramp means adjacent the end pivotally attached to the vessel. The primary and auxiliary support means are offset, with the auxiliary support means defining at the portion adjacent the primary support means an inflection point for the pipeline slidably moving from one support means to the other. Attachment of the auxiliary ramp means to the primary ramp means is accomplished through resilient mounting so as to permit relative lateral and vertical movement between the two and so as to isolate the load on the primary ramp means from the auxiliary ramp means. The auxiliary ramp means may include longitudinally separated, tubular sections independently carried by tubular sections of the primary ramp means and flange means may be provided to bridge space between each auxiliary section end and between those ends and the primary ramp means.

BACKGROUND OF THE INVENTION

This invention relates to improvements in pipelaying operations utilizing an elongate, flexible ramp means pivotally attached to a floating vessel. More particularly, this invention relates to the provision of an auxiliary ramp means carried by such a primary ramp means.

Pipelaying operations in the past have often utilized elongate, buoyant ramps pivotally attached to a floating pipelaying vessel. Generally, these ramps are comprised of elongated parallel sets of tubular pontoons joined by downwardly disposed, U-shaped tubular cross members. On the cross members a plurality of roller-like mechanisms are usually located for the purpose of providing a slidable support for a pipeline depending from the floating vessel and into a body of water. The pontoons, while preferably metallic and unitary in character, are generally flexible owing to their relatively great length Buoyant ramps of this type are illustrated in United States Hauber et al. Pat. No. 3,280,571, United States Lawrence Pat. No. 3,390,532 and United States Rochelle et al. Pat. No. 3,507,126, all of which are assigned to the assignee of the present invention. In the instance of the Rochelle et al. patent, the parallel sets of pontoons are articulated such that they are movable relative to one another whereby the profile of the ramp means may be adjusted. Although the prior art ramps disclosed in the previously identified patents are generally satisfactory, they may be amenable to improvement.

For example, certain problems may be created through the utilization of a generally horizontal section of the ramp immediately extending from the attaching means providing for pivotal attachment of the ramp to the floating vessel. This section of the ramp may be conveniently referred to as a "goose neck". The goose neck portion of the ramp is disposed with respect to the immediately adjacent section of the ramp, which in use is inclined with respect to the floating vessel, so as to define an obtuse included angle. This arrangement prevents interference of the ramp with the hitch assembly utilized to attach the ramp to the floating vessel while also avoiding a significantly abrupt bend in the pipeline which would result from positioning the inclined portion of the ramp immediately adjacent the preferred position of the hitch assembly as is hereinafter more fully discussed.

However, since the ramp is designed to transmit an axial load, through the hitch assembly, significantly increased bending moments are produced at the portion of the prior art ramp wherein the goose neck is joined with the inclined section. Thus, the possibility of failure at this point is increased.

It would, therefore, be desirable to provide a buoyant ramp, for use in a pipelaying operation, and adapted to be pivotally attached to a floating vessel, which would be devoid of portions particularly susceptible to failure by reason of increased bending moments.

In this connection, it may be noted that in many pipelaying operations, the pipelaying vessel is provided with an inclined ramp portion fixed on the vessel. The angle of inclination of this fixed ramp is generally less than the angle of inclination of the pivotally attached ramp means. Thus, an inflection point is created in the pipeline as it slidably moves from the floating vessel onto the pivotally attached ramp means. Positioning of the inclined initial portion of the prior art ramps immediately adjacent many conventional hitch assemblies, positioned in the conventionally preferred location, would generally require the pipeline to undergo an abrupt drop as it passes between the fixed ramp and the pivotally attached ramp means. As discussed above, it is the goose neck portion of the prior art buoyant ramp means which avoids this condition.

It may also be noted that there are instances wherein it may be desirable to arrange the inclination of the prior art ramp means so that no inflection point is created in the pipeline as it passes on to the initial support provided by the pivotally attached ramp means. In such instances the use of a goose neck is also dictated by the prior art insofar as the end of many such prior art ramp means includes a transversely extending attaching means which not only provides for pivotal connection of the ramp means to the vessel but also serves to tie the ends of the parallel pontoons together. Whether or not a pipeline inflection point is created at the point of initial support by the pivotal ramp means, the utilization of such an attaching means may be advantageous from, among other things, the standpoint of tying the pontoons to provide a structurallly integral unit. It would thus be desirable to retain the attaching means while elminating the goose neck. Even though the transversely extending attaching means is in a plane upwardly offset from the downwardly disposed slidable support of the ramp means, its retention, according to one aspect of the present invention, involves insuring that it does not interfere with the pipeline slidably passing onto the ramp, while still eliminating the goose neck and avoiding an abrupt pipeline drop as the pipeline passes to the ramp.

OBJECTS AND SUMMARY OF THE INVENTION

It is, therefore, a general object of the present invention to provide a pipelaying operation utilizing buoyant ramp means adapted to be pivotally attached to a floating vessel while overcoming problems of the sort previously noted.

It is a particular object of the invention to provide an improved buoyant ramp means for use in a pipeline laying operation and adapted to be pivotally attached to a floating vessel, which ramp means provides the desired degree of control over the pipeline at the inflection point while avoiding the existence of ramp means configurations tending to undesirably increase susceptibility to bending failure.

It is still another object of the invention to provide an improved pipeline laying ramp means adapted to be pivotally attached to a floating vessel and which is not only compatible with existing pipeline laying equipment such as a fixed ramp on the floating vessel and a conventional hitch assembly, but also avoids unduly abrupt differences in elevation between adjacent sections of pipeline being laid.

It is a further object of the invention to provide a pipeline laying ramp means utilizing an auxiliary ramp portion that is attached to a primary ramp portion without any significant increase in the stiffening thereof.

It is still another object of the invention to provide a pipeline laying ramp including a substantially straight terminal portion adjacent means for pivotally attaching the ramp to a floating vessel, which straight portion supports an auxiliary ramp assembly, with the load on the primary ramp being isolated from the auxiliary ramp assembly.

It is still another object of the invention to provide such a ramp wherein the primary ramp includes pontoons tied together at their ends.

It is yet another object of the invention to provide a pipelaying method wherein an intermediate and auxiliary slidable support is utilized while isolating the load on the primary support from the auxiliary support.

A preferred embodiment of the invention intended to accomplish at least some of the foregoing objects includes a primary ramp means comprised of first and second elongate, flexible, buoyant, tubular primary pontoon means attached in generally parallel relationship. Longitudinally spaced, and downwardly disposed, primary supporting means are mounted intermediate and interconnect the first and second primary pontoon means for slidably supporting a leading portion of pipeline depending from a floating vessel and into a body of water. Attaching means adjacent one end of the primary ramp means provides for interconnection of the first and second pontoon means and pivotal connection of the primary ramp means to a floating vessel. A substantially straight terminal portion of the primary pontoon means extends outwardly from the attaching means and the attaching means is offset upwardly from each of the primary supporting means.

Auxiliary ramp means is mounted solely on the primary ramp means and includes first and second elongate, tubular auxiliary pontoon means mounted respectively on the substantially straight terminal portion of the first and second primary pontoon means in generally parallel relationship with one another. The auxiliary ramp means includes longitudinally spaced auxiliary supporting means mounted intermediate and interconnecting the first and second auxiliary pontoon means for slidably supporting a trailing portion of the pipeline. The auxiliary supporting means are offset from the primary supporting means so as to define an inflection point for the pipeline slidably moving from the auxiliary supporting means to the primary supporting means.

The pontoon means of the auxiliary ramp means are resiliently clamped to the pontoon means of the primary ramp means. Each auxiliary pontoon means may include longitudinally separated sections independently carried by spaced resilient clamps carried by the primary pontoon means. Relative lateral and vertical movement between the auxiliary pontoon means and the primary pontoon means is permitted. Thus the vertical, lateral or torsional load on the primary pontoon means, which may be produced for example by current or the weight of the leading pipeline portion, is not transmitted to, i.e. is isolated from, the auxiliary pontoon means. The auxiliary pontoon sections do not add significant stiffening to the primary pontoon means by reason of the resilient nature of the connection.

Flange means may be provided to bridge space between each auxiliary pontoon section end and between those ends and the primary pontoon means.

THE DRAWINGS

Other objects and advantages of the present invention will become apparent from a subsequent detailed description thereof with reference to the accompanying drawings in which:

FIG. 1 is a side elevational view of a ramp means according to the present invention in use during a pipelaying operation;

FIG. 2 is a side elevational view, on an enlarged scale of a terminal portion of the ramp means in FIG. 1;

FIG. 3 is a top plan view of the portion of the ramp means shown in FIG. 2, taken along line 2—2 therein;

FIG. 4 is an enlarged fragmentary view of a portion of the structure shown in FIG. 3;

FIG. 5 is an elevational view taken along line 5—5 of FIG. 4; and,

FIG. 6 is a cross-sectional view taken along line 6—6 of FIG. 2 and illustrating the resilient connection between the auxiliary pontoon means and the primary pontoon means.

DETAILED DESCRIPTION

Referring now to FIG. 1, a portion of a pipelaying operation utilizing a ramp means 10 according to the present invention may be seen. The ramp means 10 is pivotally attached to a hitch assembly 12 secured to a floating vessel 14. The vessel is provided with an incline ramp 16, a pipeline tensioning apparatus 18 and a plurality of support roller assemblies 20.

The structure thus far described, apart from the ramp means 10, forms no part of the present invention per se and may be substantially identical to that disclosed in the aforesaid United States Lawrence Pat. No. 3,390,532, the disclosure of which is hereby incorporated by reference.

Depending from the floating vessel 14, on which it is supported by the roller assemblies 20 (some of which are mounted on the fixed ramp 16) is a pipeline 21. The pipeline depends from the floating vessel 14 into a body of water 22 and onto a submerged surface 24. Intermediate the floating vessel 14 and the submerged surface 24, a portion of the pipeline 22 is slidably supported by the ramp means 10 in a manner hereinafter more fully described.

The pivotable ramp means 10 includes a primary ramp means 26 and an auxiliary ramp means 28 supported on one end of the primary ramp means 26.

The primary ramp means 26 constitutes a unique modification of prior ramp means such as that disclosed in the aforesaid Lawrence Pat. No. 3,390,532 and forward of the auxiliary ramp means 28 may be substantially identical to that prior ramp means insofar as slidable support of the pipeline is concerned. The goose neck portion of that ramp means is, however, eliminated. As may be seen in FIGS. 2 and 3, first and second elongate, flexible, buoyant, tubular primary pontoon means 30 and 32 form the major part of the illustrated primary ramp means 26. These pontoon means are attached in generally parallel relationship and include parallel sets of rigid portions which are welded together end to end. It will be appreciated that alternatively the rigid portions may be mutually articulated as in the aforesaid Rochelle et al. Pat. No. 3,507,126.

In either case the rigid portions of the pontoon means are constructed to provide buoyancy chambers 34. Parallel ones of these chambers are interconnected by conduits 36 for buoyancy adjustment in a manner such as that set forth in the Lawrence Pat. No. 3,390,532 and the Rochelle et al. Pat. No. 3,507,126. Also in either case, the terminal portion 38 of the primary pontoon means 26 adjacent the hitch 12 is generally straight so as to avoid the problems associated with the prior art "goose neck" arrangement.

Forward (when viewed in an aft direction) of this straight terminal portion 38, the longitudinally spaced interconnecting conduits 36 are provided with roller assemblies 40 (FIG. 3) that are longitudinally spaced along the remainder of the primary ramp means. Both the interconnecting conduits 36 and the roller assemblies 40 mounted thereon are offset from the plane of the pontoons (i.e. downwardly disposed when the ramp means 10 is in use), whereby the pontoons serve as lateral boundaries for the cradled pipeline.

The roller assemblies 40 each provide primary supporting means which together define a primary support means for buoyantly and slidably supporting a leading portion of the pipeline 21 depending from the floating vessel 14 into the body of water 22. The roller assemblies 40, through the interconnecting conduits 36 on which they are mounted, also transmit the supported load of the leading portion of the pipeline to the primary ramp means.

As illustrated in FIGS. 2 and 3, the ends 41 and 42 of the first and second pontoon means 30 and 32 adjacent the hitch 12 are interconnected by an attaching means 44. This attaching means 44 extends transversely of the primary ramp means 26 and by interconnecting the first and second pontoon means 30 and 32 provides a structurally integral primary ramp means. The attaching means 44 also provides, by means of a pivot bar 46, for pivotal connection of the primary ramp means 26 to the hitch 12 and thus to the floating vessel 14.

An attaching plate 47 of the attaching means 44 is, in the area of connection, generally coextensive with the end portions 41 and 42 of the primary ramp means (and thus elevated above the primary supporting means). As indicated at 48 (FIG. 2), the hitch 12 is located in a position wherein interference of the hitch assembly or the attaching means with the pipeline passing from the fixed ramp 16 is avoided. In other words, the pipeline passing to the ramp means 26 clears the attaching means. However, unlike the prior art, the straight terminal section 38 of the primary ramp means 26 is employed in lieu of the goose neck, and the pipeline passing from the floating vessel is controllably supported through the utilization of the auxiliary ramp means 28.

From FIG. 3 it may be seen that the auxiliary ramp means 28 comprises parallel first and second elongate tubular auxiliary pontoon means 50 and 52. As illustrated, these pontoon means 50 and 52 may include elongate tubular auxiliary pontoons 54 mounted in parallel sets. Preferably, at least two such sets are provided in order to avoid rigidifying the auxiliary ramp means.

Each of the auxiliary pontoons 54 is resiliently clamped on the generally straight terminal portion 38 of the primary ramp means 26. In the illustrated embodiment this resilient clamping is accomplished by clamp means 56. As shown in FIG. 2, two clamp means 56 are utilized for each pontoon 54 for a purpose hereinafter described.

The clamp means 56 may include two semi-cylindrical clamping sections 58 and 60 surrounding the pontoons of the primary ramp means. From FIGS. 4 and 6 it may be seen that the semi-cylindrical sections 58 and 60 are securely mounted on the primary pontoons in any suitable manner, such as by bolt assemblies 62 extending through flanges 64 on the sections 58 and 60. Between the inner surfaces of the semi-cylindrical sections 58 and 60 and the outer surface of the primary pontoon is a resilient cushion which as illustrated takes the form of semi-cylindrical portions 66 and 68 of neoprene or the like.

Extending between the upper semi-cylindrical clamping section 58 and the lower portion of the auxiliary pontoon 54 are supporting members 70 which may be tubular in configuration. These members 70 are connected in any suitable manner between the clamping means 56 and the auxiliary pontoons 54.

From FIGS. 3 and 5 it may be seen that extending transversely of the auxiliary pontoons 54 are longitudinally spaced auxiliary supporting means for slidably supporting a trailing portion of the pipeline. These auxiliary supporting means may take the form of transverse tubular members 74 suitably connected to parallel ones of the supporting member 70. Centrally of the auxiliary ramp means and mounted on the transverse members 74 are roller assemblies 76 which may include two rollers having mutually inclined axes in a manner substantially identical to the orientation of the roller mechanisms 40 defining the primary support means.

As is the case with the primary pontoons, the auxiliary pontoons 54 provide lateral boundaries for the cradled pipeline.

From the foregoing it will be seen that the auxiliary supporting means define an auxiliary support means upwardly offset from the primary support means. The roller assembly 76 of the auxiliary supporting means nearest the primary supporting means defines an inflection point for the pipeline passing from the auxiliary ramp means to the primary ramp means as may be seen in FIG. 1.

The resilient clamping of the auxiliary ramp means to the primary ramp means permits relative lateral and vertical movement therebetween. Thus, lateral and vertical stiffening in the plane of the pontoons, either auxiliary or main is avoided. Also, loads on the primary ramp means, such as the load of the pipeline transmitted to the primary ramp means by means of the supporting means 40, are isolated from the auxiliary ramp means. Thus, the auxiliary ramp means performs the function of the previously discussed prior art goose neck without providing structure particularly susceptible to bending failure.

As above noted, each of the auxiliary pontoons 54 is independently provided with two resilient clamping mounts. This arrangement facilitates stabilization of the auxiliary pontoons 54, by providing two support points while avoiding lateral or vertical stiffening in the planes of either these auxiliary pontoons 54 or the primary pontoons.

In this connection, it may be noted that the preferred embodiment of the auxiliary pontoon means includes three sets of pairs of parallel pontoons 54. This arrangement, or any such arrangement with at least two such sets, is additionally advantageous from the standpoint of obviating stiffening problems which may be associated with even resiliently mounted long auxiliary pontoons. Where such long auxiliary pontoons are employed, however, the resilient mounting pads should be sufficiently thick to permit adequate relative movement.

It will also be appreciated that use of a short auxiliary pontoon comprised of a single section is contemplated.

Between the spaced ends of the independently mounted auxiliary pontoons 54, flange means (FIGS. 3 and 4) are provided in order to block the passage of cables associated with the pipelaying operating into the pipe supporting area. In the preferred embodiment this flange means takes the form of an annular cylindrical flange 78 projecting from an end cap 80 of one of the pontoons toward and into engagement with the end cap 82 of the adjacent pontoon.

Flange means in the form of end plates 84 on the terminal ends of the auxiliary pontoons 54 are also provided for a similar purpose. These plates 84 extend downwardly toward the primary pontoons and are shaped so as to conformingly envelop those pontoons, without being attached thereto, as indicated at 86.

Considering now a method aspect of the present invention it may thus be seen that in a pipelaying operation wherein a pipeline is slidably supported on a fixed ramp 16 on a floating vessel 14 and depends into a body of water 22 with a leading portion of the pipeline slidably supported on an inclined ramp means 10 pivotally attached to the floating vessel 14, an auxiliary and intermediate slidable support for the trailing pipeline portion is provided. The pivotable ramp means is attached to the floating vessel in a position wherein the pipeline clears the transversely extending attaching means 44 integral with the pivotable ramp means. After clearing the attaching means, the pipeline is supported on the intermediate support which defines an inflection point (independent of the existence or non-existence of any inflection point at the position of adjacency between the fixed ramp 16 and the pivotable ramp means 10) for the pipeline slidably passing into the body of water. The intermediate support is coupled to a straight portion of the primary ramp means in a manner whereby the load on the pivotable ramp means is isolated from the intermediate slidable support.

SUMMARY OF THE ADVANTAGES

From the foregoing it may thus be seen that in following the present invention, several advantages may be realized. A particular advantage of the present invention is the elimination of the prior art "goose neck" while retaining compatibility of the ramp means of the present invention with existing conventional equipment such as the hitch assembly.

Moreover, the desirable tie-in of the end portions of the pontoons of the primary ramp means may also be retained through the utilization of the auxiliary ramp means.

Also advantageous is the resilient mounting of the auxiliary pontoon means which avoids stiffening of the pontoons and isolates the load on the primary ramp means from the auxiliary ramp means.

The provision of spaced portions separately mounted on the primary ramp means enhances the flexibility of the auxiliary ramp means, and additional stabilization of the spaced sections is obtained utilizing spaced resilient clamping means.

Although the invention has been described with reference to a particular preferred form, it will be apparent to those skilled in the art that additions, modifications, deletions and substitutions may be made in that preferred form without departing from the spirit or scope of the invention as defined in the appended claims.

What is claimed is:

1. Apparatus for use in a pipelaying operation and adapted to be pivotally attached to a floating vessel, the apparatus comprising:
    elongate, flexible, buoyant primary ramp means comprised of parallel and interconnected sets of substantially rigid primary ramp portions and including primary support means for buoyantly and slidably supporting a leading portion of pipeline depending from the floating vessel and into a body of water;
    attaching means, extending transversely of said primary ramp means between said primary ramp portions to interconnect said portions at one end of said primary ramp means, and providing for pivotal connection of said primary ramp means to the floating vessel;
    auxiliary, elongate, ramp means comprised of at least one parallel set of substantially rigid auxiliary ramp portions and including auxiliary support means for slidably supporting a trailing portion of the pipeline depending from the floating vessel;
    mounting means for mounting said auxiliary ramp means on said primary ramp means adjacent said one end of said primary ramp means with adjacent portions of said primary and auxiliary support means being offset; and
    said auxiliary support means defining at the portion thereof adjacent a portion of said primary support means, an inflection point for the pipeline slidably moving from said auxiliary support means to said primary support means.

2. Apparatus for use in a pipelaying operation and adapted to be pivotally attached to a floating vessel, the apparatus comprising:
    elongate, flexible, buoyant primary ramp means comprised of parallel and interconnected sets of substantially rigid primary ramp portions and including primary support means for buoyantly and slidably supporting a leading portion of pipeline depending from the floating vessel and into a body of water;
    attaching means, extending transversely of said primary ramp means between said primary ramp portions to interconnect said portions at one end of said primary ramp means, and providing for pivotal connection of said primary ramp means to the floating vessel;
    auxiliary, elongate, ramp means comprised of at least one parallel set of substantially rigid auxiliary ramp portions and including auxiliary support means for slidably supporting a trailing portion of the pipeline depending from the floating vessel;
    mounting means for mounting said auxiliary ramp means on said primary ramp means adjacent said one end of said primary ramp means with adjacent portions of said primary and auxiliary support means being offset; and
    said auxiliary support means defining at the portion thereof adjacent a portion of said primary support means, an inflection point for the pipeline slidably moving from said auxiliary support means to said primary support means;
    said mounting means comprising clamping means for resiliently attaching said auxiliary ramp means to said primary ramp means.

3. Apparatus for use in a pipelaying operation and adapted to be pivotally attached to a floating vessel, the apparatus comprising:
    elongate, flexible, buoyant primary ramp means comprised of parallel and interconnected sets of substantially rigid primary ramp portions and including primary support means for buoyantly and slidably supporting a leading portion of pipeline depending from the floating vessel and into a body of water;
    attaching means, extending transversely of said primary ramp means between said primary ramp portions to interconnect said portions at one end of said primary ramp means, and providing for pivotal connection of said primary ramp means to the floating vessel;
    auxiliary, elongate, ramp means comprised of at least one parallel set of substantially rigid auxiliary ramp portions and including auxiliary support means for slidably supporting a trailing portion of the pipeline depending from the floating vessel;
    mounting means for mounting said auxiliary ramp means on said primary ramp means adjacent said one end of said primary ramp means with adjacent portions of said primary and auxiliary support means being offset; and
    said auxiliary support means defining at the portion thereof adjacent a portion of said primary support means, an inflection point for the pipeline slidably moving from said auxiliary support means to said primary support means;
    said auxiliary ramp means comprising at least two parellel sets of substantially rigid auxiliary ramp portions with each of said auxiliary ramp portions being independently carried by said primary ramp means.

4. Apparatus according to claim 3 wherein said mounting means comprises:
    a plurality of clamp means, one each for resiliently attaching each of said auxiliary ramp portions to said primary ramp means.

5. Apparatus according to claim 4 wherein each of said clamp means consists of:
    first and second, longitudinally spaced, resilient supporting means for resiliently supporting one of said auxiliary ramp portions on said primary ramp means.

6. Apparatus for use in a pipelaying operation and adapted to be pivotally attached to a floating vessel, the apparatus comprising:
    elongate, flexible, buoyant primary ramp means comprised of parallel and interconnected sets of substantially rigid primary ramp portions and including primary support means for buoyantly and slidably supporting a leading portion of pipeline depending from the floating vessel and into a body of water;

said primary support means interconnecting parallel primary ramp portions and transmitting supported load thereto;

attaching means providing for pivotal connection of one end of said primary ramp means to the floating vessel;

auxiliary, elongate ramp means comprised of at least one parallel set of substantially rigid auxiliary ramp portions and including auxiliary support means for slidably supporting a trailing portion of the pipeline depending from the floating vessel; and resilient mounting means supporting said auxiliary ramp means on said primary ramp means adjacent said one end of said primary ramp means, for isolating the load on said primary ramp means from said auxiliary supporting means.

7. Apparatus according to claim 6 wherein said auxiliary ramp means comprises:

at least two parallel sets of substantially rigid auxiliary ramp portions with each of said auxiliary ramp portions being independently carried by said primary ramp means.

8. Apparatus according to claim 7 wherein said mounting means consists of:

first and second, longitudinally spaced, resilient clamp means for resiliently supporting each one of said auxiliary ramp portions on said primary ramp means.

9. Apparatus according to claim 6 wherein:

said resilient mounting means supports said auxiliary ramp means with adjacent portions of said primary and auxiliary suport means being offset, and said auxiliary support means defining at the portion thereof adjacent a portion of said primary support means as inflection point for the pipeline slidably moving from said auxiliary support means to said primary support means.

10. Apparatus for use in a pipelaying operation and adapted to be pivotally attached to a floating vessel, the apparatus comprising:

primary ramp means including
  first and second elongate, flexible, buoyant, tubular primary pontoon means, said first and second primary pontoon means being attached in generally parallel relationship and at least the portions thereof adjacent one end of said ramp means being generally straight,
  a plurality of longitudinally spaced primary supporting means, mounted intermediate said first and second primary pontoon means, for slidably supporting a leading portion of pipeline depending from the floating vessel and into a body of water, said primary supporting means interconnecting said first and second primary pontoon means and transmitting supported load thereto,
  attaching means extending transversely of said primary ramp means to interconnect the ends of said generally straight portions of said first and second primary pontoon means, said attaching means being offset upwardly from each of said primary supporting means and providing for pivotal connection of said primary ramp means to the floating vessel;

auxiliary ramp means including
  first and second elongate, tubular, auxiliary pontoon means,
  a plurality of longitudinally spaced auxiliary supporting means, mounted intermediate said first and second auxiliary pontoon means and offset upwardly from said primary supporting means, for slidably supporting a trailing portion of the pipeline, said auxiliary supporting means interconnecting said first and second auxiliary pontoon means and transmitting supported load thereto, and resilient mounting means mounting said first and second auxiliary pontoon means in generally parallel relationship and respectively on said generally straight portions of said first and second primary pontoon means for isolating the load on said primary ramp means from said auxiliary supporting means.

said auxiliary supporting means adjacent said primary supporting means defining an inflection point for the pipeline slidably moving from said auxiliary supporting means to said primary supporting means.

11. Apparatus accordng to claim 10 wherein said resilient mounting means comprises:

clamp means for resiliently clamping said auxiliary pontoon means on said primary pontoon means so as to permit relative lateral and vertical movement therebetween.

12. Apparatus according to claim 10 wherein said first and second auxiliary pontoon means each include:

at least two longitudinally separated sections independently carried by said primary pontoon means.

13. Apparatus according to claim 12 wherein said resilient mounting means comprises:

first and second spaced clamp means for mounting each of said sections on said primary pontoon means so as to permit relative lateral and vertical movement between said auxiliary pontoon means and said primary pontoon means.

14. Apparatus according to claim 12 including:

flange means bridging the space between said separated sections.

15. Apparatus according to claim 12 including:

flange means bridging the space between the said primary pontoon means and the ends of said auxiliary pontoon means.

16. In a method of laying pipeline from a floating vessel wherein the method includes slidably supporting a portion of the pipeline on an inclined ramp means fixed to the floating vessel with the remainder of the pipeline depending into a body of water while a leading portion thereof is slidably supported on support means of a ramp means pivotally attached to the floating vessel through transversely extending attaching means integral with the pivotally attached ramp means, the improvement comprising:

slidably passing the pipeline from the inclined ramp means fixed to the vessel to the support means of the ramp means pivotally attached to the vessel while clearing the tranversely extending attaching means, and supporting a trailing portion of the pipeline on an intermediate slidable support interposed intermediate the fixed inclined ramp means and the support means of the pivotally attached ramp means and coupled to and upwardly offset from a straight inclined portion of the pivotally attached ramp means, so as to define an inflection point for the pipeline slidably passing into the body of water, while isolating the load on the pivotally attached ramp means from the intermediate slidable support.

17. In a method of laying pipeline from a floating vessel wherein the method includes slidably supporting a portion of the pipeline on an inclined ramp means fixed to the floating vessel with the remainder of the pipeline depending into a body of water while a leading portion thereof is slidably supported on support means of a ramp means pivotally attached to the floating vessel through transversely extending attaching means integral with the pivotally attached ramp means, the improvement comprising:

slidably passing the pipeline from the inclined ramp means fixed to the vessel to the support means of the ramp means pivotally attached to the vessel while clearing the tranversely extending attaching means, and supporting a trailing portion of the pipeline on an intermediate slidable support interposed intermediate the fixed inclined ramp means and the support means of the pivotally attached ramp means and coupled to and upwardly offset from a straight inclined portion of the pivotally attached ramp means, so as to define an inflection point for the pipeline slidably passing into the body of water, while resiliently isolating the load on the pivotally attached ramp means from the intermediate slidable support.

References Cited
UNITED STATES PATENTS

| | | | |
|---|---|---|---|
| 3,273,346 | 9/1966 | Delaruelle et al. | 61—72.3 |
| 3,411,306 | 11/1968 | Mosby | 61—72.4 |
| 3,540,226 | 11/1970 | Sherrod | 61—72.4 |

JACOB SHAPIRO, Primary Examiner